United States Patent
Welin et al.

(10) Patent No.: US 11,917,522 B2
(45) Date of Patent: Feb. 27, 2024

(54) MANAGING RADIO BEARER TRAFFIC BETWEEN RADIO NETWORK NODES

(71) Applicant: Telefonaktiebolaget LM Ericsson (publ), Stockholm (SE)

(72) Inventors: Annikki Welin, Solna (SE); Jon Reveman, Vaxholm (SE); Catalin Meirosu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 273 days.

(21) Appl. No.: 17/312,573

(22) PCT Filed: Dec. 10, 2018

(86) PCT No.: PCT/SE2018/051268
§ 371 (c)(1),
(2) Date: Jun. 10, 2021

(87) PCT Pub. No.: WO2020/122773
PCT Pub. Date: Jun. 18, 2020

(65) Prior Publication Data
US 2021/0329532 A1    Oct. 21, 2021

(51) Int. Cl.
*H04W 40/24* (2009.01)
*H04W 76/12* (2018.01)
(Continued)

(52) U.S. Cl.
CPC ..... *H04W 40/248* (2013.01); *H04W 28/0861* (2023.05); *H04W 76/12* (2018.02); *H04W 92/20* (2013.01)

(58) Field of Classification Search
CPC ... H04L 45/745; H04L 12/4641; H04L 45/30; H04L 45/02; H04L 45/20; H04W 64/00;
(Continued)

(56) References Cited

U.S. PATENT DOCUMENTS

2017/0019833 A1    1/2017 Luo et al.
2018/0041425 A1*   2/2018 Zhang .................. H04L 45/745
(Continued)

FOREIGN PATENT DOCUMENTS

WO      2010039085 A1   4/2010

OTHER PUBLICATIONS

Author Unknown, "Technical Specification Group Services and System Aspects; Study on enhancemnet of EPC for low latency communication including device mobility (Release 16)," Technical Report 23.739, Version 0.1.0, Jan. 2018, 3GPP Organizational Partners, 11 pages.
(Continued)

*Primary Examiner* — Anez C Ebrahim
(74) *Attorney, Agent, or Firm* — Withrow & Terranova, PLLC (57) ABSTRACT

It is provided a method for managing radio bearer traffic between radio network nodes. The method is performed in a first radio network node and comprises the steps of: establishing a peer connection with a peer radio network node, the peer connection comprising a tunnel; ensuring a routing table of the first radio network node contains entries for each one of a local set of UEs attached to the first radio network node; transmitting an output route update message indicating that each one of the local set of UEs is attached to the first radio network node; receiving an input route update message from the peer radio network node, the input route update message indicating that each one in a peer set of UEs is attached to the peer radio network node; adjusting the routing table based on the peer set of UEs; and routing radio bearer traffic.

17 Claims, 5 Drawing Sheets

(51) Int. Cl.
*H04W 28/086* (2023.01)
*H04W 92/20* (2009.01)

(58) Field of Classification Search
CPC ..... H04W 60/00; H04W 12/06; H04W 76/11; H04W 72/23; H04W 40/02; H04W 76/12; H04W 40/248; H04W 28/0808
See application file for complete search history.

(56) References Cited

U.S. PATENT DOCUMENTS

2018/0213390 A1 7/2018 Vesterinen et al.
2020/0045610 A1* 2/2020 Shih ................. H04L 45/28

OTHER PUBLICATIONS

Author Unknown, "Technical Specification Group Services and System Aspects; Local IP access (LIPA) mobility and Selected IP Traffic Offload (SIPTO) at the local network (Release 12)," Technical Report 23.859, Version 12.0.1, Apr. 2013, 3GPP Organizational Partners, 68 pages.
Author Unknown, "Technical Specification Group Radio Access Network; Evolved Universal Terrestrial Radio Access Network (E-UTRAN); X2 application protocol (X2AP) (Release 15)," Technical Specification 36.423, Version 15.1.0, Mar. 2018, 3GPP Organizational Partners, 354 pages.
International Search Report and Written Opinion for International Patent Application No. PCT/SE2018/051268, dated Jul. 10, 2019, 12 pages.

* cited by examiner

MANAGING RADIO BEARER TRAFFIC BETWEEN RADIO NETWORK NODES

This application is a 35 U.S.C. § 371 national phase filing of International Application No. PCT/SE2018/051268, filed Dec. 10, 2018, the disclosure of which is incorporated herein by reference in its entirety.

TECHNICAL FIELD

The present disclosure relates to the field of cellular communication and in particular to managing radio bearer traffic between radio network nodes in cellular networks.

BACKGROUND

Cellular networks are under constant evolution due to evolving demands of users. One such demand relates to latency. Latency in communication is of great importance for some applications. In particular, latency is of great importance for communication in control systems, e.g. in industrial environments.

At the same time, it is desired to keep complexity of communication low.

SUMMARY

It is an object is to reduce latency for communication which can be applied in industrial environments.

According to a first aspect, it is provided a method for managing radio bearer traffic between radio network nodes. The method is performed in a first radio network node and comprises the steps of: establishing a peer connection with a peer radio network node, the peer connection comprising a tunnel; ensuring a routing table of the first radio network node contains entries for each one of a local set of user equipments, UEs, attached to the first radio network node; transmitting an output route update message to the peer radio network node, the output route update message indicating that each one of the local set of UEs is attached to the first radio network node; receiving an input route update message from the peer radio network node, the input route update message indicating that each one in a peer set of UEs is attached to the peer radio network node; adjusting the routing table based on the peer set of UEs, such that all UEs in the peer set of UEs are associated with the tunnel for communicating with the peer radio network node; and routing radio bearer traffic in the tunnel to the peer radio network node in accordance with the routing table.

The method may further comprise: determining when a new UE attaches to the first radio network node; and performing the steps of ensuring a routing table and transmitting the route output update message, when the new UE is determined to attach to the first radio network node.

The method may be repeated for a plurality of peer radio network nodes such that separate tunnels are set up for each one of the peer radio network nodes.

In the step of transmitting the output route update message, the output route update message may comprise the peer set of UEs received from another peer radio network node than the radio network node to which the output route update message is transmitted.

The peer connection may be an X2 connection.

Each connection may comprise a plurality of tunnels, for accommodating different priorities of communication.

The step of routing may comprise forwarding data received from another peer radio network node in accordance with the routing table.

The step of routing may comprise acting as an end point for any radio bearer to the peer network node.

According to a second aspect, it is provided a first radio network node for managing radio bearer traffic between radio network nodes. The first radio network node comprises: a processor; and a memory storing instructions that, when executed by the processor, cause the first radio network node to: establish a peer connection with a peer radio network node, the peer connection comprising a tunnel; ensure a routing table of the first radio network node contains entries for each one of a local set of user equipments, UEs, attached to the first radio network node; transmit an output route update message to the peer radio network node, the output route update message indicating that each one of the local set of UEs is attached to the first radio network node; receive an input route update message from the peer radio network node, the input route update message indicating that each one in a peer set of UEs is attached to the peer radio network node; adjust the routing table based on the peer set of UEs, such that all UEs in the peer set of UEs are associated with the tunnel for communicating with the peer radio network node; and route radio bearer traffic in the tunnel to the peer radio network node in accordance with the routing table.

The first radio network may further comprise instructions that, when executed by the processor, cause the first radio network node to: determine when a new UE attaches to the first radio network node; and to perform the instructions of ensure a routing table and transmit the route output update message, when the new UE is determined to attach to the first radio network node.

The instructions may be repeated for a plurality of peer radio network nodes such that separate tunnels are set up for each one of the peer radio network nodes.

The output route update message may comprise the peer set of UEs received from another peer radio network node than the radio network node to which the output route update message is transmitted.

The peer connection may be an X2 connection.

Each connection may comprise a plurality of tunnels, for accommodating different priorities of communication.

The instructions to route may comprise instructions that, when executed by the processor, cause the first radio network node to forward data received from another peer radio network node in accordance with the routing table.

The instructions to route may comprise instructions that, when executed by the processor, cause the first radio network node to act as an end point for any radio bearer to the peer network node.

According to a third aspect, it is provided a computer program for managing radio bearer traffic between radio network nodes. The computer program comprises computer program code which, when run on a first radio network node causes the first radio network node to: establish a peer connection with a peer radio network node, the peer connection comprising a tunnel; ensure a routing table of the first radio network node contains entries for each one of a local set of user equipments, UEs, attached to the first radio network node; transmit an output route update message to the peer radio network node, the output route update message indicating that each one of the local set of UEs is attached to the first radio network node; receive an input route update message from the peer radio network node, the input route update message indicating that each one in a peer set of UEs is attached to the peer radio network node; adjust the routing table based on the peer set of UEs, such that all UEs in the peer set of UEs are associated with the tunnel for communicating with the peer radio network node; and route radio bearer traffic in the tunnel to the peer radio network node in accordance with the routing table.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, it is provided a solution that enables routing traffic directly between peer radio network nodes, e.g. in an industrial site. The routing is based on routing update messages being propagated between radio network nodes, after which each radio network node maintains a routing table. The routing update messages contain data of which radio base station each UE is attached.

Figure 1:
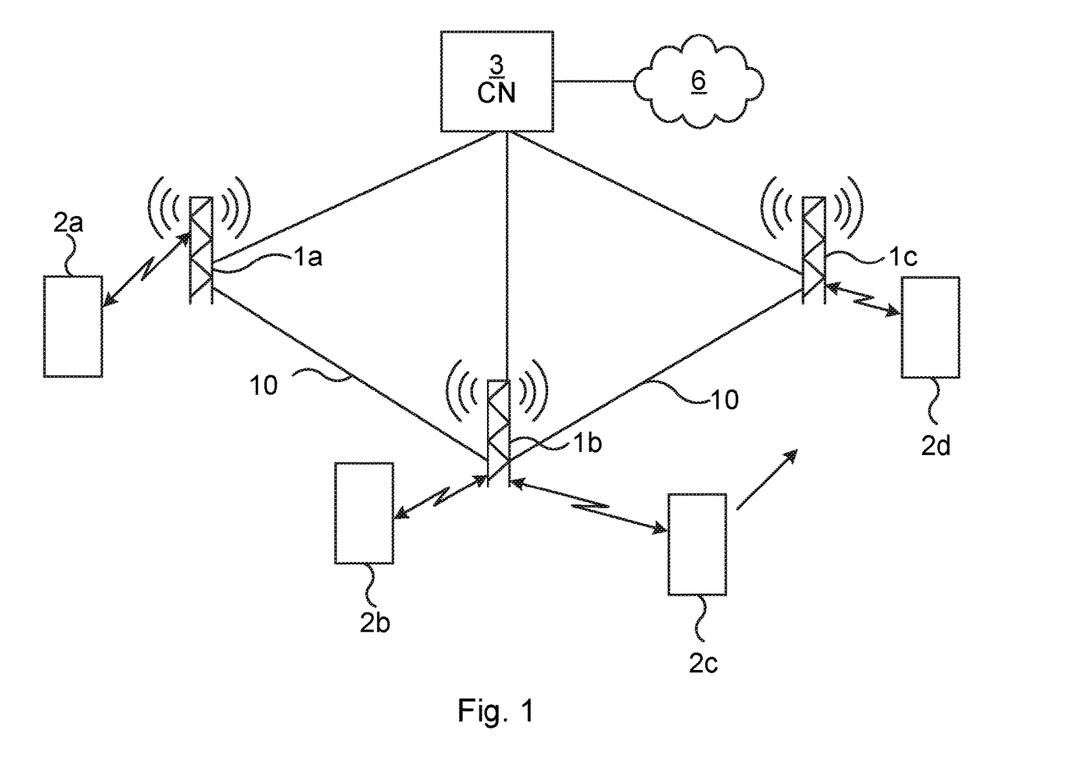
FIG. 1 is a schematic diagram illustrating an environment in which embodiments presented herein can be applied.

FIG. 1 is a schematic diagram illustrating a cellular communication network 9 where embodiments presented herein may be applied. The cellular communication network 9 comprises a core network 3 and one or more radio network nodes 1a-c, here in the form of radio base stations being gNode Bs (next generation node Bs) or evolved Node Bs, also known as eNode Bs or eNBs. The radio network node 1 could also be in the form of Node Bs, BTSs (Base Transceiver Stations) and/or BSSs (Base Station Subsystems), etc. The radio network nodes 1a-c provides radio connectivity over a wireless interface to a plurality of instances of user equipment, UEs, 2a-d. The term UE is also known as mobile communication terminal, wireless device, mobile terminal, user terminal, user agent, wireless terminal, machine-to-machine device etc., and can be, for example, what today are commonly known as a mobile phone, smart phone or a tablet/laptop with wireless connectivity.

The cellular communication network 9 may e.g. comply with any one or a combination of 5G NR (New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink (DL) communication occurs from a radio network node 1a-c to a wireless device 2a-d and uplink (UL) communication 4b occurs from a wireless device 2a-d to a radio network node 1a-c. The quality of the wireless radio interface to each wireless device 2 can vary over time depending on the position of the wireless device 2a-d, due to effects such as fading, multipath propagation, interference, etc.

The radio network nodes 1a-c are also connected to the core network 3 for connectivity to central functions and a wide area network 6, such as the Internet.

The three network nodes 1a-c may be provided within one industrial site. While there are three network nodes 1a-c of the industrial site in this example, the industrial site can be provided with any suitable number of radio network nodes. Other radio network nodes (of the cellular network) can be provided in another industrial site or for public use (not shown in FIG. 1).

In this example, a first UE 2a is attached to the first radio network node 1a. The UE 2a forms part of a fixed robot, e.g. as part of a production line. A second UE 2b is also part of a fixed installation, e.g. a camera or a sensor, and is attached to the second radio network node 1b. A third UE 2c forms part of a mobile robot and is also currently attached to the second radio network node 1b. A fourth UE 2d forms part of a production controller and is attached to the third radio network node 1c.

In order to properly control the industrial site, the production controller, containing the fourth UE 2d, needs to communicate with the other UEs 2a-c. Also, for this industrial application it is of great importance that the communication has low latency. In this way, the controller can reliably perform real-time control e.g. of a production line of the industrial site. The low latency is achieved by the radio network nodes 1a-c routing traffic between them over peer connections 10.

There is a peer connection 10 between the first radio network nodes 1a and the second radio network node 1b, as well as between the second radio network node 1b and the third radio network node. The peer connections 10 enables direct communication between two radio network nodes 1a-c. The peer connection 10 can e.g. be based on an X2 interface.

Figure 2:
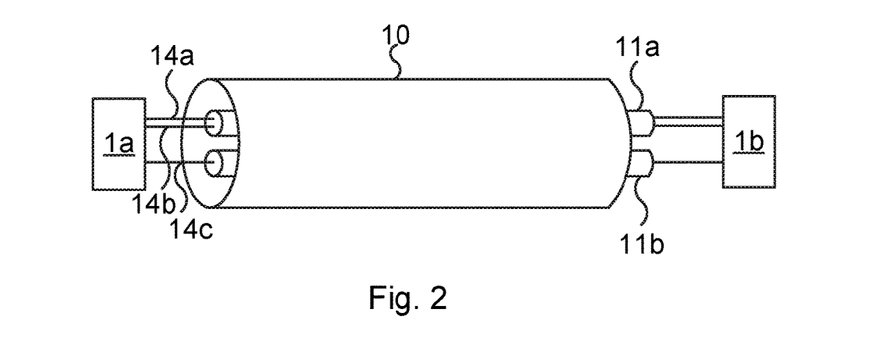
FIG. 2 is a schematic diagram illustrating communication between the radio network nodes of FIG. 1.

FIG. 2 is a schematic diagram illustrating communication between the radio network nodes of FIG. 1. The diagram illustrates how radio bearers 14a-c are organised within a peer connection 10 between the first radio network node is and the second radio network node. Other peer connections 10 can be constructed according to the same principles.

Within the peer connection, radio bearers are aggregated in tunnels, such that radio bearers between the same two nodes (and optionally the same priorities of communication) are aggregated in a single tunnel.

By aggregate several radio bearers in one tunnel in this way, the encryption needs to be set up only once for the (aggregated) tunnel, not individually for each one of the radio bearers. This reduces the computational overhead and provides support for faster mobility, since there is no need to spend computational cycles on exchanging encryption keys (or generating new ones) every time a UE moves to a new radio network node.

The tunnel can be based on the same encryption technology that protects bearers in a 3GPP network with a difference that the keys are allocated to the radio network nodes instead of to the individual UEs. The encryption technology can e.g. be based on EEA (Evolved packet system Encryption Algorithm) of PDCP (Packet Data Convergence Protocol) connections for radio bearers, and GTP (GPRS Tunnelling Protocol) for higher-level (Si) bearers.

In this example, the peer connection comprises a first tunnel 11a and a second tunnel 11b. The first tunnel 11a aggregates a first radio bearer 14a and a second radio bearer 14b. The second tunnel 11b carries a third radio bearer 14c.

Figure 3A:
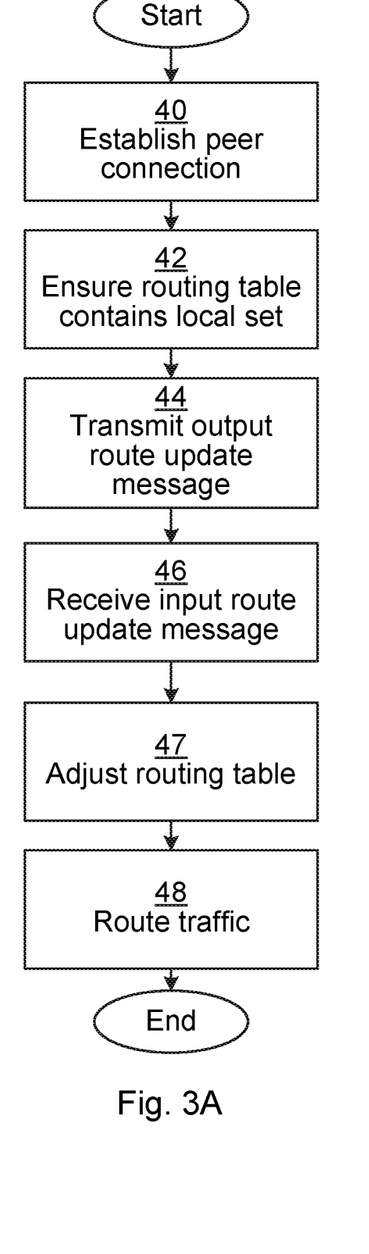
FIGS. 3A-B are flow charts illustrating methods for managing radio bearer traffic between radio network nodes.
Figure 3B:
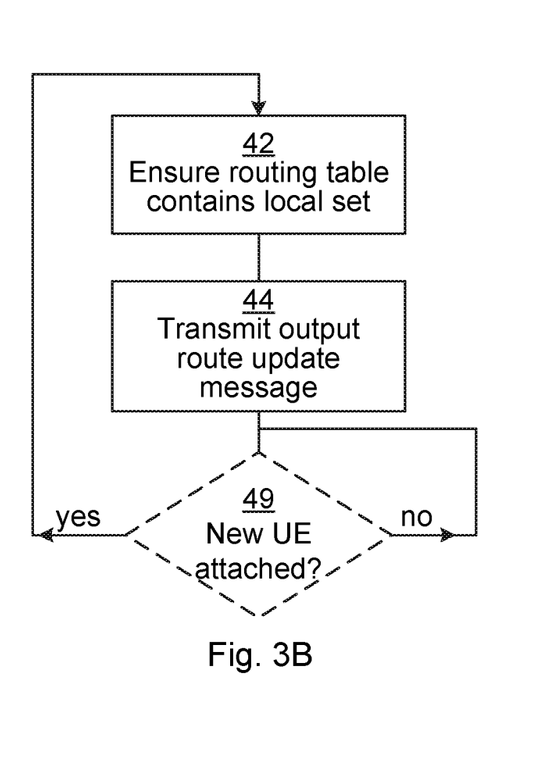

FIGS. 3A-B are flow charts illustrating methods for managing radio bearer traffic between radio network nodes. For reasons of clarity and stringency of the description, the radio network node of this method is denoted the first radio network node, but any one of the radio network nodes 1a-c of FIG. 1 can perform this method. Each radio network node is responsible for one or more cells, identified by using cell identifiers. In this way, there is no physical restriction of the extension of the radio network nodes within a site.

In an establish peer connection step 40, the first radio network node establishes a peer connection with a peer radio network node. The peer connection comprises a tunnel, sometimes referred to as an XUP tunnel herein. The peer connection can e.g. be based on an X2 connection, as known per se according to 3GPP (3$^{rd}$ Generation Partnership Project) specifications. Using X2 between radio network nodes keeps the communications secured in the 3GPP domain.

Each connection may comprise a plurality of tunnels, for accommodating different priorities of communication. A single tunnel can then accommodate all radio bearers of a certain priority of communication to a specific peer radio network node. The priority of communication can e.g. be indicated by a QCI (QoS (Quality of Service) Class Identifier) associated with the radio bearer. Each radio bearer can be a long term (or even permanent) radio bearer.

In an ensure routing table contains local set step 42, the first radio network node ensures that a routing table of the first radio network node contains entries for each one of a local set of UEs attached to the first radio network node.

Hence, the routing table contains entries for all UEs attached to the radio network node, as well as their ongoing communications. Each element of the routing table can e.g. have the following structure:

TABLE 1

Example of fields in each entry of routing table

| Parameter | Format | Purpose |
|---|---|---|
| RNTI (Radio Network Temporary Identifier) | 3GPP defined | Indicates the UE being the source of traffic. |
| RABID (Radio Access Bearer Identifier) | 3GPP defined | Bearer to use within a tunnel |
| Destination Identifier | IP address or UUID (Universally Unique Identifier) | Used to find route entry when communication is to be routed |
| ECGI (E-UTRAN (Evolved Universal Terrestrial Radio Access Network) Cell Global Identifier) | 3GPP defined | Used when the destination is locally attached to the radio network node |
| Tunnel identifier | In the form of UUID | Identifies the tunnel to use for UEs attached to a peer radio network node |

Optionally, the routing table also contains a hop counter. In this way, if the hop counter indicates that the number of hops is too large for communication between a certain pair of UEs, traffic can be routed conventionally, through the core network.

In a transmit output route update message step 44, the first radio network node transmits an output route update message to the peer radio network node. The output route update message indicates that each one of the local set of UEs is attached to the first radio network node.

In a receive input route update message step 46, the first radio network node receives an input route update message from the peer radio network node. The input route update message indicates that each one in a peer set of UEs is attached to the peer radio network node. The input route update message can also contain entries for UEs attached to other peer network nodes not directly connected to the first radio network node.

Optionally, in a next iteration of the transmit output route update message step 44, the output route update message can comprise the peer set of UEs received from another peer radio network node than the radio network node to which the output route update message is transmitted. In this way, routing information is propagated between several radio network nodes.

In an adjust routing table step 47, the first radio network node adjusts the routing table based on the peer set of UEs, such that all UEs in the peer set of UEs are associated with the tunnel for communicating with the peer radio network node.

In a route traffic step 48, the first radio network node routes radio bearer traffic in the tunnel to the peer radio network node in accordance with the routing table. Optionally, the routing comprises forwarding data received from another peer radio network node in accordance with the routing table.

Furthermore, the routing may comprise acting as an end point for any radio bearer to the peer network node, i.e. terminating the radio bearer(s). This allows the first radio network node to decrypt the data of the radio bearer to thus be able to route the data.

The method can be repeated for a plurality of peer radio network nodes such that separate tunnels are set up for each one of the peer radio network nodes.

Looking now to FIG. 3B, only new or modified steps, compared to the steps FIG. 3A will be described.

In an optional new UE attached step 49, the first radio network node determines when a new UE attaches to the first radio network node. The attaching can be a new, random access, attach. Alternatively, the attaching can be a handover from another radio network node.

When the new UE is determined to attach to the first radio network node, the method returns to the ensure routing table contains local set step 42 and also performs the transmit output route update message step 44.

The presented solution provides mobility support. This will now be exemplified with reference also to FIG. 1, where the third UE 2C is mobile.

In this example, the third UE 2c moves to the right in FIG. 1, until it will eventually detect also the third radio network node 1c. First, the signal strength is greater for the second radio network node 1b, where it is attached in RRC (Radio Recourse Control) connected mode. When the third UE 2c continues to move to the right, the signal strength from the third radio network node 1c will eventually surpass that of the second radio network node 1b.

At that time, the second radio network node 1b decides and initiates the handover to the third radio network node 1c by signaling to the third radio network node 1c that it needs a new radio bearer for the third UE 2c. This is signalled in the form of a route update message. This operation is performed through an extension of the g/eNB Configuration Update message specified in 3GPP 36.423, to include an identifier (which could be a UUID or IP address) of the UE as part of the Neighbor Information in Served Cells to Modify group. Both the identifier (which could be a UUID or IP address) and an operation code are included in the message. The operation code is an enumerated value, which e.g. can be 1 when the identifier is to be added (new UE arriving in area of coverage) and 2 when the identifier is to be removed (the UE has left area of coverage).

The establishment of the new radio bearer for the third UE 2C by second radio network node triggers a route update message towards the third radio network node 1c (e.g. via the second radio network node 1b), to announce the arrival of the third UE 2c in its area of coverage. The release of the radio bearer formerly allocated to the third UE 2C by the second radio network node 1b triggers a route update messages towards other radio network nodes 1a, 1c (with whom second radio network node has established peer relations) to announce the departure of the third UE 2c from its area of coverage.

A simple routing scheme is implemented in the radio network node to support reaching UEs that are located further than one direct peer. An example of how this works will now be explained with reference to FIG. 1. Consider the following routing tables:

TABLE 2

Example of routing table for the first radio network node

| Destination ID | Tunnel ID |
|---|---|
| 1.0.0.13 (first UE 2a) | None (Local radio) |
| 1.0.0.10 (second UE 2b) | T1 |
| 1.0.0.18 (third UE 2c) | T1 |
| 1.0.0.12 (fourth UE 2d) | T1 |

TABLE 3

Example of routing table for the first radio network node

| Destination ID | Tunnel ID |
|---|---|
| 1.0.0.13 (first UE 2a) | T1 |
| 1.0.0.10 (second UE 2b) | None (Local radio) |
| 1.0.0.18 (third UE 2c) | None (Local radio) |
| 1.0.0.12 (fourth UE 2d) | T2 |

TABLE 4

Example of routing table for the first radio network node

| Destination ID | Tunnel ID |
|---|---|
| 1.0.0.13 (first UE 2a) | T2 |
| 1.0.0.10 (second UE 2b) | T2 |
| 1.0.0.18 (third UE 2c) | T2 |
| 1.0.0.12 (fourth UE 2d) | None (Local radio) |

Hence, the routing table in each radio network node contains all the UEs attached to the network, and, for each UE, an identifier of the tunnel that should be used for sending traffic towards that UE. Upon receiving traffic via a tunnel, a radio network node will lookup in its own routing table and determine whether that packet is addressed locally or it should forward it to another tunnel.

Using the presented solution, complexity of communications in industrial environments is significantly reduced while low latency communication is provided, since communication between UEs does not need to occur higher up in the network than radio network nodes. In other words, low latency communication is provided at low complexity, and thus low cost.

Moreover, companies smaller than a telecom operator can deploy a local 3GPP network while keeping operational costs in check because only a subset of all 3GPP functions needs to be deployed and operated. Furthermore, the solution can operate independent of an edge cloud that might be located away from the industrial location, e.g. for mining industry.

In addition to low latency, jitter is also low in the presented solution, since the communication is handled by processes within one network function, in the routing between radio network nodes.

Figure 4:
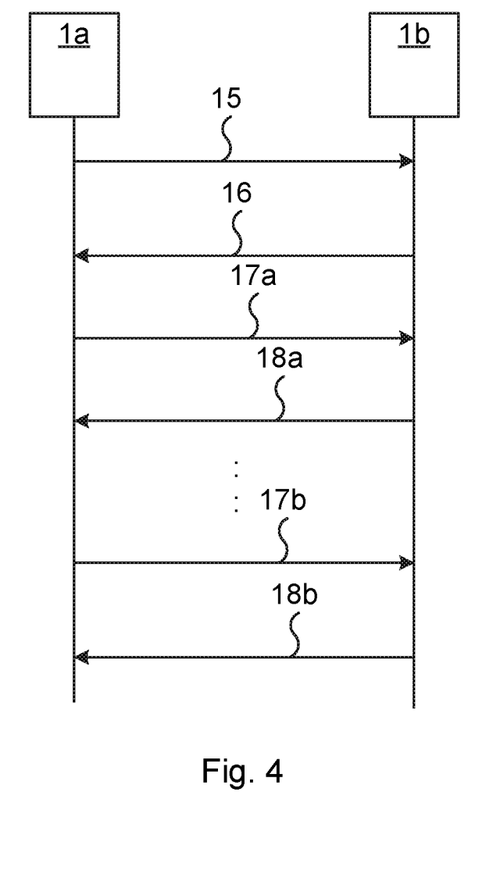
FIG. 4 is a sequence diagram illustrating communication between two radio network nodes of FIG. 1 to exchange routing information according to one embodiment.

FIG. 4 is a sequence diagram illustrating communication between the first radio network node 1a and the second radio network node 1b of FIG. 1 to exchange routing information according to one embodiment. The sequence diagram corresponds to a large extent the methods illustrated by FIGS. 3A-B.

In a setup request 15, the first radio network node 1a initiates the setup of the peer connection with the second radio network node 1b. When X2 is used, the setup request 15 can be an X2 setup extended request, e.g. as specified in 3GPP TS (Technical Specification) 36.423, with an extension to include part of the Neighbor Information structure (see section 90.2.98 of 3GPP TS 36.423), and an identifier of the tunnel to be used, e.g. as an integer. The setup request is provided to all peer radio network nodes with which communication is to be set up.

The second radio network node 1b responds with a setup response 16, after which the peer connection is established. When X2 is used, the setup response can be an X2 setup response.

Messages 15 and 16 form part of the establish peer connection step 40 of FIG. 3A.

When routing updates are to be communicated from the first radio network node 1a, the first radio network node 1a transmits an output route update message 17a to the second radio network node 1b. The second radio network node 1b responds with an acknowledgement 18a that the output route update message 17a had been received correctly.

Additional output route update messages 17b can be sent with corresponding acknowledgements 18b. Furthermore, route update messages can also be sent from the second radio network node to the first radio network node, as well as to/from/between other radio network nodes.

The output route update messages 17a-b can e.g. be an eNB config update extended message and the acknowledgements 18a-b can e.g. be eNB config update extended ack message.

Messages 17a-b and 18a-b can form part of the transmit output route update message step 44 of FIG. 3A.

Figure 5:
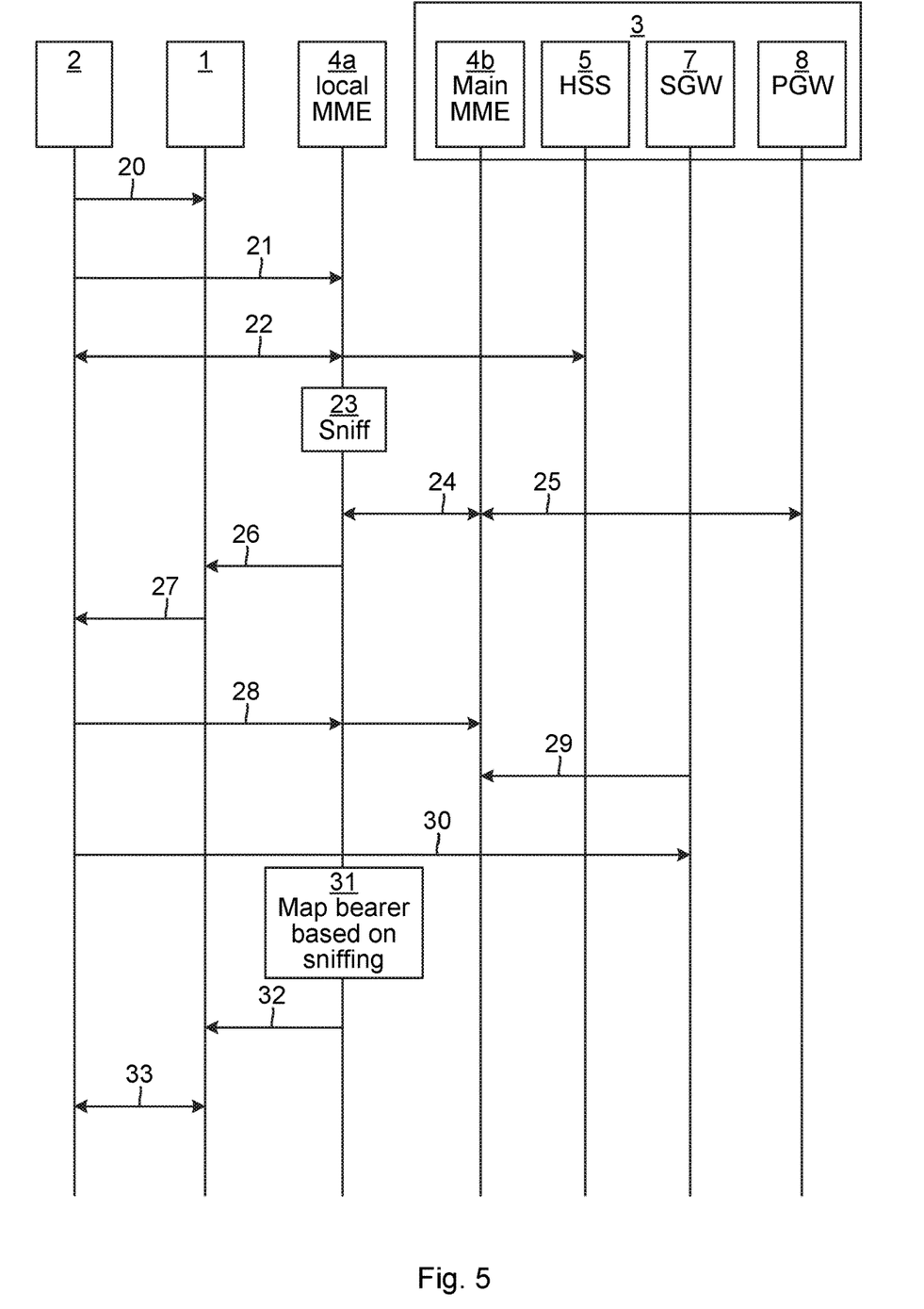
FIG. 5 is a sequence diagram illustrating communication between various network entities of FIG. 1 when a UE attaches according to one embodiment.

FIG. 5 is a sequence diagram illustrating communication between various network entities of FIG. 1 when a UE attaches according to one embodiment.

Here, the core network 3 is shown with more detail, comprising a main MME (Mobility Management Entity) 4b, an HSS (Home Subscriber Server) 5, an SGW (Serving Gateway) 7 and a PGW (Packet Data Network Gateway) 8.

Furthermore, a local MME 4a is provided at the site of the radio network node 1 for more efficient processing. The local MME 4a implements a reduced set of the functionality specified for a full 3GPP MME, for a set of radio network nodes e.g. of the site. While the local MME 4a mainly helps to reduce the time of the attach procedure related to local low latency bearers, the local MME also reduces delay of re-attachment to the network after planned maintenance of UEs (e.g. in robots) or of the industrial network. For instance, local connectivity can be re-established faster than global Internet access. For non-low latency local connectivity, standard 3GPP bearers are established as usual during the attach procedure using existing 3GPP mechanisms The UE 2 performs an RRC connection setup 20 with the radio network node, after which the UE performs a NAS (Non-Access Stratum) attach and PDN (Packet Data Network) connection request 21 with the local MME.

Authentication 22 is then performed between the UE 2 and the local MME, as well as between the local MME 4a and the HSS 5.

When authentication 22 is performed, the local MME 4a sniffs 23 the IMSI (International Mobile Subscriber Identity) and security credentials of bearer(s) and authentication credentials for the UE.

The local MME 4a sets up non-local bearers 24 with the main MME 4b and the main MME 4b creates a session 25 with the PGW 8.

The local MME 4a is now ready to send an attach accepted message 26 to the radio network node 1 which can then send a bearer connection request 27 to the UE 2.

The UE 2 then transmits a RRC connection complete 28 which is also sent to the local MME 4a.

The main MME 4b and the SGW 7 can then communicate to modify the radio bearer 29. At this point the UE 2 sends a NAS attach complete and activate default bearer message 30.

The local MME 4a sniffs message 30 and can now inform the radio network node 1 of a NAS attach and XUP bearer setup. The radio network node 1 and the UE 2 now communicate an RRC connection setup being complete 33.

No changes are needed for the UE in this attach procedure, nor for any of the core network nodes 4b, 5, 7, 8.

The local MME 4a acts as a proxy towards the main MME 4b for non-local communication bearers. Proxy in this context means that the local MME 4a will forward the information in the attach procedure that relates to establishing non-local bearers to the main MME 4b, thus impersonating the UE from the main MME 4b perspective.

Moreover, the local MME 4a informs the radio network node 1 with respect to the tunnels that could be used by the UE and triggers the radio network node 1 to create an entry in its routing table associated with the presence of the UE. This in turn triggers the routing update message procedure, as described in more detail above.

Figure 6:
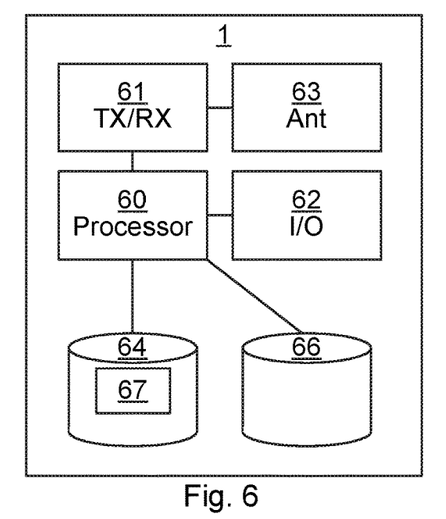
FIG. 6 is a schematic diagram illustrating components of the radio network nodes of FIG. 1 according to one embodiment.

FIG. 6 is a schematic diagram illustrating components of the radio network nodes 1a-c of FIG. 1 according to one embodiment. The radio network nodes 1a-c are here represented by a single radio network node 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 6o can be configured to execute the method described with reference to FIGS. 3A-B above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The radio network node 1 further comprises an I/O interface 62 for communicating with external and/or internal entities. Optionally, the I/O interface 62 also includes a user interface.

A transceiver 61 comprises suitable analogue and digital components to allow signal transmission and signal reception with a wireless device using one or more antennas 63.

Other components of the radio network node 1 are omitted in order not to obscure the concepts presented herein.

Figure 7:
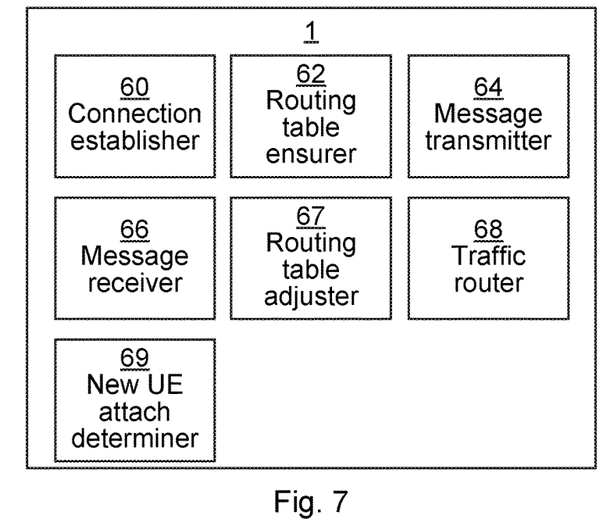
FIG. 7 is a schematic diagram showing functional modules of the radio network nodes of FIG. 1 according to one embodiment.

FIG. 7 is a schematic diagram showing functional modules of the radio network nodes 1a-c of FIG. 1 according to one embodiment. The radio network nodes 1a-c are here represented by a single radio network node 1. The modules are implemented using software instructions such as a computer program executing in the radio network node. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

A connection establisher 6o corresponds to step 40. A routing table ensurer 62 corresponds to step 42. A message transmitter 64 corresponds to step 44. A message receiver 66 corresponds to step 46. A routing table adjuster 67 corresponds to step 47. A traffic router 68 corresponds to step 48. A new UE attach determiner 69 corresponds to step 49

Figure 8:
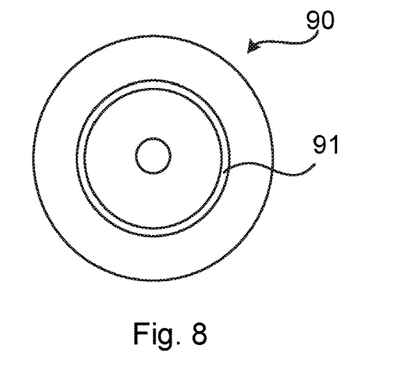
FIG. 8 shows one example of a computer program product comprising computer readable means.

FIG. 8 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for managing radio bearer traffic between radio network nodes, the method being performed in a first radio network node and comprising the steps of:
established a peer connection with a peer radio network node, the peer connection comprising a tunnel between the peer radio network node and the first radio network node;
ensuring a routing table of the first radio network node contains entries for each one of a local set of user equipments, UEs, attached to the first radio network node;
transmitting an output route update message to the peer radio network node, the output route update message indicating that each one of the local set of UEs is attached to the first radio network node;
receiving an input route update message from the peer radio network node, the input route update message indicating that each one in a peer set of UEs is attached to the peer radio network node;
adjusting the routing table based on the peer set of UEs, such that all UEs in the peer set of UEs are associated with the tunnel for communicating with the peer radio network node; and
routing radio bearer traffic in the tunnel to the peer radio network node in accordance with the routing table.

2. The method according to claim 1, further comprising:
determining when a new UE attaches to the first radio network node;
and performing the steps of ensuring a routing table and transmitting the route output update message, when the new UE is determined to attach to the first radio network node.

3. The method according to claim 1, wherein the method is repeated for a plurality of peer radio network nodes such that separate tunnels are set up for each one of the peer radio network nodes.

4. The method according to claim 3, wherein in the step of transmitting the output route update message, the output route update message comprises the peer set of UEs received from another peer radio network node than the radio network node to which the output route update message is transmitted.

5. The method according to claim 1, wherein the peer connection is an X2 connection.

6. The method according to claim 1, wherein each connection comprises a plurality of tunnels, for accommodating different priorities of communication.

7. The method according to claim 1, wherein the step of routing comprises forwarding data received from another peer radio network node in accordance with the routing table.

8. The method according to claim 7, wherein the step of routing comprises acting as an end point for any radio bearer to the peer network node.

9. A first radio network node for managing radio bearer traffic between radio network nodes, the first radio network node comprising:
a processor; and
a memory storing instructions that, when executed by the processor, cause the first radio network node to:
establish a peer connection with a peer radio network node, the peer connection comprising a tunnel between the peer radio network node and the first radio network node;
ensure a routing table of the first radio network node contains entries for each one of a local set of user equipments, UEs, attached to the first radio network node;
transmit an output route update message to the peer radio network node, the output route update message indicating that each one of the local set of UEs is attached to the first radio network node;
receive an input route update message from the peer radio network node, the input route update message indicating that each one in a peer set of UEs is attached to the peer radio network node;
adjust the routing table based on the peer set of UEs, such that all UEs in the peer set of UEs are associated with the tunnel for communicating with the peer radio network node; and
route radio bearer traffic in the tunnel to the peer radio network node in accordance with the routing table.

10. The first radio network node according to claim 9, further comprising instructions that, when executed by the processor, cause the first radio network node to:
determine when a new UE attaches to the first radio network node;
and to perform the instructions of ensure a routing table and transmit the route output update message, when the new UE is determined to attach to the first radio network node.

11. The first radio network node according to claim 9, wherein the instructions are repeated for a plurality of peer radio network nodes such that separate tunnels are set up for each one of the peer radio network nodes.

12. The first radio network node according to claim 11, wherein the output route update message comprises the peer set of UEs received from another peer radio network node than the radio network node to which the output route update message is transmitted.

13. The first radio network node according to claim 9, wherein the peer connection is an X2 connection.

14. The first radio network node according to claim 9, wherein each connection comprises a plurality of tunnels, for accommodating different priorities of communication.

15. The first radio network node according to claim 9, wherein the instructions to route comprise instructions that, when executed by the processor, cause the first radio network node to forward data received from another peer radio network node in accordance with the routing table.

16. The first radio network node according to claim 15, wherein the instructions to route comprise instructions that, when executed by the processor, cause the first radio network node to act as an end point for any radio bearer to the peer network node.

17. A non-transitory computer readable medium, comprising instructions for managing radio bearer traffic between radio network nodes, wherein the instructions, when executed by a processor, cause the first radio network node to:
- establish a peer connection with a peer radio network node, the peer connection comprising a tunnel between the peer radio network node and the first radio network node;
- ensure a routing table of the first radio network node contains entries for each one of a local set of user equipments, UEs, attached to the first radio network node;
- transmit an output route update message to the peer radio network node, the output route update message indicating that each one of the local set of UEs is attached to the first radio network node;
- receive an input route update message from the peer radio network node, the input route update message indicating that each one in a peer set of UEs is attached to the peer radio network node;
- adjust the routing table based on the peer set of UEs, such that all UEs in the peer set of UEs are associated with the tunnel for communicating with the peer radio network node; and
- route radio bearer traffic in the tunnel to the peer radio network node in accordance with the routing table.

* * * * *